J. W. JACKSON.
ELECTRIC BUTT WELDING AND MOLDING DEVICE FOR METAL WHEEL RIMS.
APPLICATION FILED JULY 11, 1919.
1,348,948.
Patented Aug. 10, 1920.
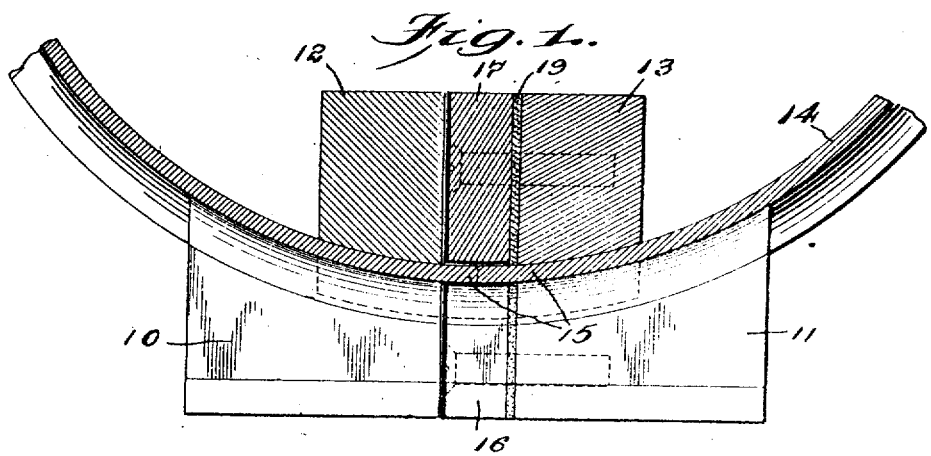
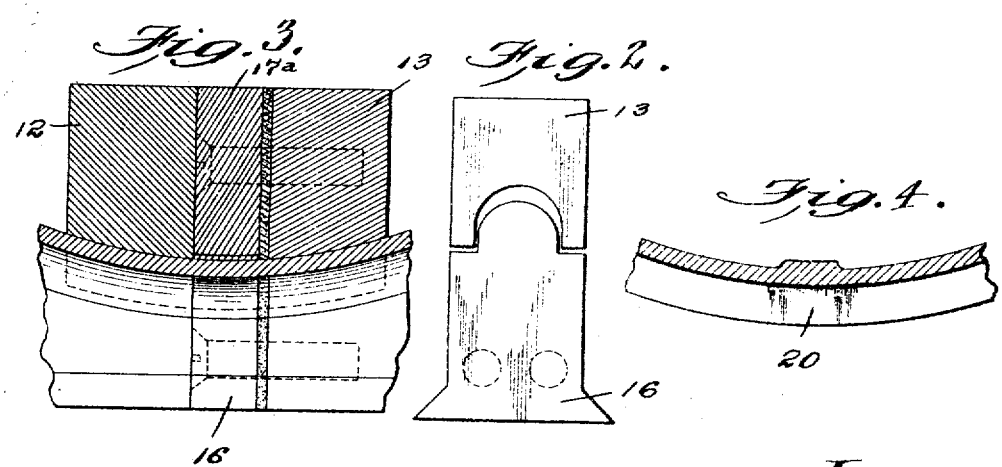
Inventor
J. W. Jackson.
By
H. Woodward
Atty.

UNITED STATES PATENT OFFICE.

JOSEPH W. JACKSON, OF ANDERSON, INDIANA.

ELECTRIC BUTT-WELDING AND MOLDING DEVICE FOR METAL WHEEL-RIMS.

1,348,948.  Specification of Letters Patent.  Patented Aug. 10, 1920.

Application filed July 11, 1919. Serial No. 310,150.

*To all whom it may concern:*

Be it known that I, JOSEPH W. JACKSON, a citizen of the United States, residing at Anderson, in the county of Madison and State of Indiana, have invented certain new and useful Improvements in Electric Butt-Welding and Molding Devices for Metal Wheel-Rims, of which the following is a specification.

The invention has for its object to effect improvements in butt welding devices, particularly the welding of the butts of channeled metal rims upon which rubber or other tires are to be fitted, such tires requiring that a smooth continuous and unbroken surface be provided for their support in order that the tires may render efficient service. It is the purpose to provide a means to make a reinforced butt weld electrically without forming a bur or enlargement in the channel at the joint, but providing a flush surface at the weld coincident with a projection of the abutting channel surfaces.

Additional objects, advantages and features of invention will appear from the construction, arrangement and combination of parts involved, as will appear from the following description and drawings, presenting the invention, wherein, Figure 1 is a longitudinal sectional view of a wheel rim having the ends in position for welding between electrodes and former embodying my invention, Fig. 2 is an end view of the electrodes, Fig. 3 is a view similar to Fig. 1 of one possible way of applying my invention, showing a continuous portion of metal in the device, Fig. 4 is a detail of the form produced in the appliance represented in Fig. 4.

There is illustrated a set of lower electrodes 10 and 11, and upper electrodes 12 and 13. The electrodes 10 and 12, and those 11 and 13 are usually carried on respective laterally slidable elements of a welding machine of familiar make, the electrodes 12 and 13 being also mounted pivotally upon the sliding element and operable to raise and lower, as will be understood, these features being familiar in machines now generally used, are not illustrated in detail, as comprising no essential part of the present invention, and it is simply desired to explain how the electrodes are used. The rim to be welded in the present instance is semi-circular in cross section and thickened at its middle portion, the ends of the rolled blank being in such relation that they may be readily presented one against the other, butt on. The lower electrodes 10 and 11 are therefore curved from one side to the other to conform to the arc of the rim, around its circumference while they are also transversely curved convexly, to fit snugly in the groove of the rim, while the electrodes 12 and 13 are similarly adapted to fit upon the inner face of the rim. The vertically adjacent pairs of electrodes, in addition to serving as electrical conductors are also employed as gripping devices to hold the rim 14 securely to press the edges together as the current is communicated. Secured upon the electrodes 11 and 13 adjacent the electrodes 10 and 12, there are forming blocks 16 and 17, the first having an upper surface corresponding to the upper surface of the electrode 15, while the second former block has its lower face formed in a shape corresponding to that of the electrode 13. The upper face of the former block 17, however, is offset slightly outward from the line of work, or inward with respect to the rim 14, as indicated in Fig. 1, while the block 16 is arranged with its upper face coincident with the longitudinal geometrical projection of the adjacent faces of the electrodes 10 and 11, and the blocks are also of a thickness to lie spaced from the electrodes 10 and 12 when initial gripping action upon the butts of the rim occurs. Between the blocks 16 and 17, and the respective electrodes to which they are attached, there may be also interposed a suitable material 19, having low conductivity. It has been found in practice that the blocks 16 and 17 may be formed of any desired non-inflammable material, but it may be found preferable to form them of an insulating and heat resisting material.

In use, a rim 14 having its ends 15 gripped between the respective sets of electrodes as shown in Fig. 1, in the operation of the welding machine, the current is turned on and force applied to the upper electrodes bearing them upon the lower, and also bearing the two laterally opposed sets of electrodes toward each other. The resultant weld obtained with my appliance is illustrated in Fig. 4, in which figure the work is represented as having been welded, producing a reinforcement 20 upon the inner side of the rims, while an uninterrupted channel surface is provided.

In use in this way the surface at the outer or channel side, will be continuous and without deviation from the projected contour of the adjacent surfaces, which is of especial advantage in the wheel rim upon which a rubber tire is to be mounted, obviating the liability of raising the tire at one point.

What is claimed:

1. A welding device for channeled metal wheel rims to receive tires, comprising two sets of electrode devices relatively reciprocable, each including a channel member shaped to fit snugly within the channel of a wheel rim or felly and an inner member shaped to fit snugly against the inner surface of such rim or felly in opposition to the first mentioned member, a channel forming member between the channel members first mentioned and alined with a geometrical longitudinal projection thereof, and a second forming member between the said inner members of said electrode devices but spaced inwardly of a geometrical longitudinal projection thereof, whereby when the electrodes are energized and said electrode devices pressed toward each other in engagement upon rim butts the latter will be welded with a continuous unmodified surface in the channel and reinforced by an enlargement at the inner side.

2. A welding device for channeled metal wheel rims comprising two sets of electrode devices relatively reciprocable, each including a channel member shaped to fit snugly within the channel of a rim and an inside member shaped to fit snugly against the inner surfaces of such rim in opposition to the channel member, a channel forming member carried by one of said channel members shaped and positioned between the electrode devices with a surface alined with a longitudinal geometrical projection of said channel member, a fire resistant material of low conductivity, forming a flush joint between the two last named elements, and a second forming member carried by one of said inside members between the electrode devices shaped and positioned with a surface conforming to that of the inside members, but set off inwardly therefrom with respect to an engaged rim and parallel to a longitudinal projection of the inside members, and fire resistant material of low conductivity between the last named forming and inside members, said forming members being of a lesser dimension between the electrode devices than the initial distance between the latter.

In testimony whereof I have affixed my signature in presence of two witnesses.

JOSEPH W. JACKSON.

Witnesses:
JAMES H. STANTON,
H. PERLMUTTER.